United States Patent [19]

Hug

[11] Patent Number: 4,738,529

[45] Date of Patent: Apr. 19, 1988

[54] APPARATUS FOR MEASURING THE TRANSIT TIME OF ELECTROMAGNETIC WAVES

[75] Inventor: Gottfried Hug, Waldkirch-Siensbach, Fed. Rep. of Germany

[73] Assignee: Erwin Sick GmbH Optik-Elektronik, Waldkirch, Fed. Rep. of Germany

[21] Appl. No.: 761,203

[22] Filed: Jul. 31, 1985

[30] Foreign Application Priority Data

Aug. 7, 1984 [DE] Fed. Rep. of Germany ....... 3429062

[51] Int. Cl.$^4$ .............................................. G01N 21/88
[52] U.S. Cl. .................... 356/73.1; 324/510
[58] Field of Search ............. 356/73.1, 4, 5; 324/51, 324/52

[56] References Cited

U.S. PATENT DOCUMENTS 3,900,261  8/1975  Wingate ............................... 356/4 X
4,234,256  11/1980  Higginbotham et al. .......... 356/73.1

Primary Examiner—Davis L. Willis
Assistant Examiner—S. A. Turner
Attorney, Agent, or Firm—Townsend & Townsend

[57] ABSTRACT

Figure 1:
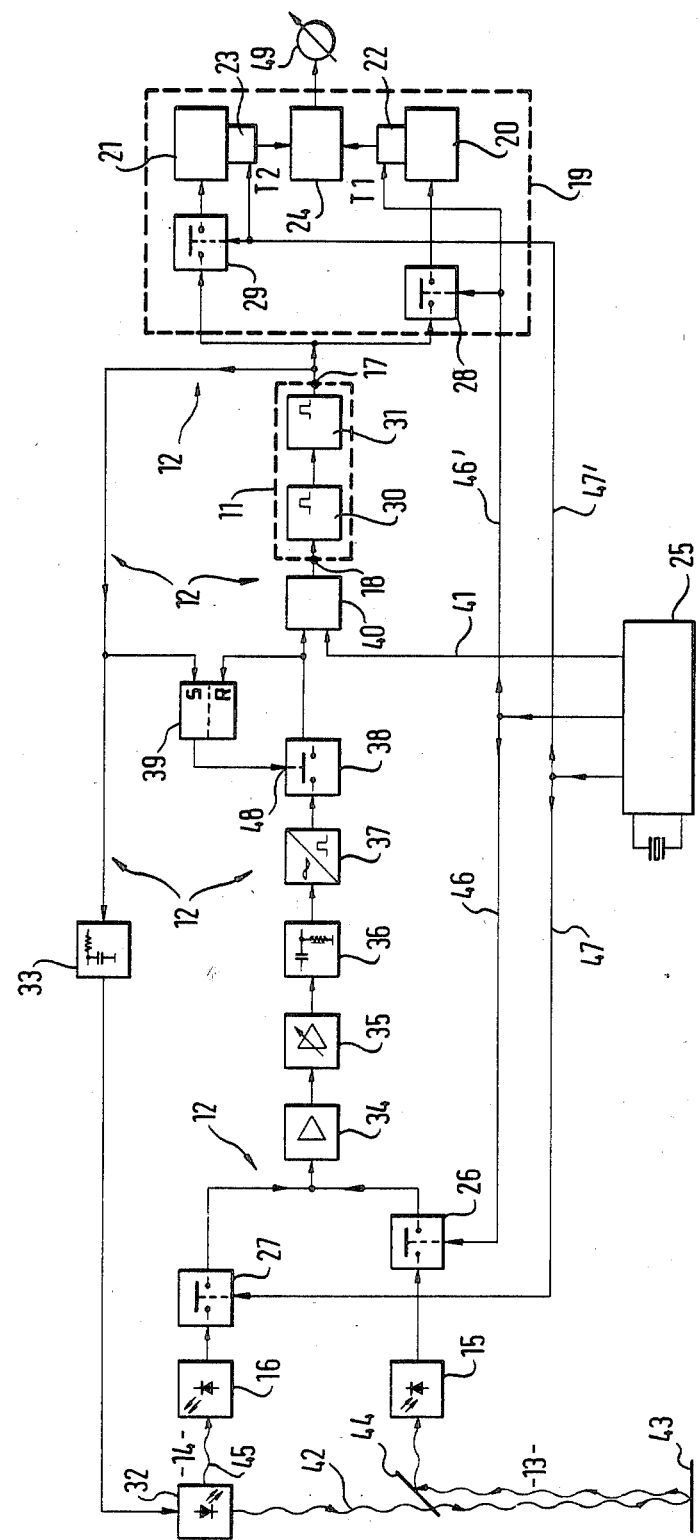

An apparatus for measuring the transit time of electromagnetic waves has a pulse generator (11) which is arranged in a feedback loop (12) and which can be triggered by pulses. Either the measurement path (13) or a reference path (14) with a reference receiver (16) at the end of it can be selectively included in the feedback loop (12). The pulse generator is also connected to a computing/counting stage (19) which counts the pulse transmitted during the measurement and reference periods separately and computes the transit time therefrom (FIG. 1).

15 Claims, 2 Drawing Sheets

APPARATUS FOR MEASURING THE TRANSIT TIME OF ELECTROMAGNETIC WAVES

The invention relates to an apparatus for measuring the transit time of electromagnetic waves, in particular light waves, over a measurement path of predetermined length, the apparatus comprising a transmitter energised by an electrical pulse generator which transmits the electrical wave in the form of wave pulses along the measurement path; a measurement receiver provided at the end of the measurement path which receives the wave pulses and converts them into electrical received pulses; and also an electronic processing circuit for determining the pulse transit time. When the speed of light is known the distance travelled by the wave can also be determined from the transit time, alternatively if the distance is known the speed of propagation of light in the medium can be determined.

Apparatuses for measuring the transit time of electromagnetic waves, in particular of light waves, are known in numerous forms.

A very high accuracy for transit time measurement can be achieved by means of the laser-interference measurement technique, however this must be contrasted with a considerable degree of constructional complexity so that apparatus of this kind is very expensive. A further disadvantage lies in the unwieldy construction, the short measurement paths and the fact that only a differential reading is possible, i.e. it is not possible to determine the absolute value of the transit time.

Other transit time measurements based on the determination of the phase relationship between the transmitted and received signals are predominantly used with large measurement paths. The measurement range is very restricted for short distances.

The principal object underlying the present invention is to provide an apparatus of the initially named kind which has a measurement range down to the distance zero and is not restricted at the lower end, which has high accuracy, which permits a compact construction, which does not place any special requirements on the optical system and which can be economically manufactured.

In order to satisfy this object the invention provides that the pulse generator which can be triggered by pulses is arranged in a feedback loop extending between its output and its trigger input; that both the measurement path and a reference path having a reference receiver at the end can be alternatively included in the feedback loop during a measurement time period and a reference time period respectively, which are both large relative to the pulse duration; and that the pulse generator also energises a computing/counting stage which computes the transit time from the length of the measurement time period and the reference time period and from the number of pulses transmitted during the same.

The physical basis for the measurement method of the invention is thus formed by the relationship between the measurement path, the medium present there, the speed of light and the time. On this basis transit times of 6 psec result for a transmitter-receiver arrangement based on the reflection principle for a measurement path of 1 mm. Times of this order of magnitude can only be determined with a considerable degree of technical complexity using a single measurement. This is avoided by the measurement process of the invention. For this purpose a known arrangement of photoreceiver and modulatable sender is used. No particular requirements are placed on the optical side of this arrangement. The apparatus that is used contains an electronic circuit concept which makes it possible to provide an exact evaluation of the flow of information between the optical transmitter and the optical receiver using conventional inexpensive components.

In accordance with the invention the transit time information obtained by a pulse passing along the measurement path is accumulated by repetition. For this purpose one associates the pulse generator with the transmitter and the measurement receiver in such a way that the received signal is passed back to the pulse generator as a trigger signal so that a feedback loop with a predetermined time delay is present.

In accordance with the invention all the transit times of numerous loop cycles are linked together using such a feedback loop. If one investigates the time behaviour of a plurality of loop cycles then one finds therein, the base transit time for the feedback loop multiplied by the number of loop cycles plus the transit time for the measurement path which has also been multiplied by the number of loop cycles. If one now alternatingly carries out an accumulation with a short circuit measurement path or with the insertion of a known reference path and an accumulation with a measurement path inserted in the feedback loop then one can determine the transit time from the summed pulses because the base transit time and the drift of the feedback loop (all transmitter and receiver components) are eliminated. One thus directly obtains the transit time over the measurement path multiplied by the number of measurement cycles. If one selects the number of loop cycles which take place during one measurement cycle to be large then one can increase the accuracy of the transit time measurement practically as desired, which can be realised with economical digital components. The only prerequisite for this is that nothing changes on the measurement path during one measurement cycle.

A particularly simple realisation of the present invention is ensured if the computing/counting stage has first and second counters which are connectable to the output of the pulse generator during the measurement period and the reference period respectively, if the first and second counters are followed by dividing stages in which, at the end of the measurement period and of the reference period, the respective quotients of the measurement period and the reference period and the number of pulses counted during these time periods are formed; and if the dividing stages are connected to a difference forming stage which delivers a signal representative of the transit time.

A practical realisation of the invention is characterised in that the measurement receiver and the reference receiver can be selectively and alternatively connected into the feedback loop via switches which can be closed by a time control circuit for the measurement period and the reference period respectively.

Furthermore, provision can be made for the first and second counters to be selectively and alternatively connectable to the output of the pulse generator via switches which can be closed by the time control circuit for the measurement time period and the reference time period respectively.

An advantageous further development of the invention is characterised in that pulse generator consists of a pulse pause generator, and a pulse generator which are preferably connected in series with the pulse pause generator being triggerable by an input pulse and the pulse generator being triggered at the end of the pulse pause generated by the pulse pause generator.

A particularly precise evaluation is achieved if a pulse shaper which forms a pulse with a clear peak is inserted between the pulse generator and the transmitter.

It is expedient, in order to obtain an advantageous signal evaluation, for the first and second switches which are connected to the measurement receiver and to the reference receiver to be jointly applied to an amplifier which leads to the pulse generator. In practical use different amplitude conditions result from the test object. In order to take account of these differing amplitude conditions a further development of the invention provides an amplitude regulator after the amplifier. Information concerning the size of the amplitude can be coupled out at the amplitude regulator and is available for further use.

A particularly important further development of the invention is characterised in that a differentiation stage is inserted into the branch between the first and second switches, which are respectively connected to the measurement receiver and to the reference receiver, and the input of the pulse generator. In this arrangement a zero passage comparator should be connected to the differentiation stage. In this way the time of switching is made more precise at the zero passage comparator. One excludes through differentiation those faults which could arise through the difference and drift of the integration time at the PIN photodiodes which are expediently used as measurement and reference photoreceivers respectively.

Accordingly, no unusual requirements need be placed on the signal delay times of the PIN photodiodes and of the amplifiers, which makes it possible to use parts which are good value for money.

A further advantageous embodiment is so designed that a normally closed gate is inserted into the branch between the first and second switches, which are connected to the measurement receiver and to the reference receiver respectively, and the input of the pulse generator; that the gate is opened by a gate control circuit on the appearance of the end flank (trailing flank) of each transmitted pulse at the output of the pulse generator and is closed again on the appearance of a received pulse at the output of the gate, for which purpose the set input of the gate control circuit is connected to the output of the pulse generator and the reset input is connected to the output of the gate.

By opening of the gate during the transmitted pulse and closing of the same by the received pulse it is ensured that only the time period which is relevant for the evaluation has an effect on the subsequent part of the circuit. Any disturbances which occur during the pulses are thus effectively eliminated.

An OR gate is preferably inserted into the feedback loop directly in front of the pulse generator, with the second input of the OR gate being connected to the time control circuit to receive a start-stop signal. The signal which is required to initiate and to maintain the measurement is thus passed to the pulse generator via the OR gate.

The abovementioned pulse pause generator ensures the necessary recovery phase for the analog components and triggers the transmitted pulse generator. No long time stability is required of the two time stages because they lie within a common signal path and drifting has no effect due to autocompensation.

It is appropriate to use time stages with small jitter noise because in this way a statistical effect on the measurement accuracy occurs.

The transmitted pulse generator is directly connected to the feedback loop and ensures the correct rise and decay times of the transmitted pulse which should have obliquely rising and falling flanks.

The time control circuit also determines the times at which the switches close and thus the number of circuits of the pulses in the feedback loop during one measurement cycle and one reference cycle. The time control circuit controls all the switches and also determines the start and the end of a measurement. It terminates the respective measurement or reference cycle by interrupting the feedback loop.

The important advantage of the invention lies in the fact that through the large number of linked cycles the time difference between the measurement and reference cycles arises in proportion to the number of pulse circuits. In this way transit times from the psec range can be transformed into the $\mu$sec range and components which are good value for money are available for carrying out the evaluation in this range.

Figure 2:
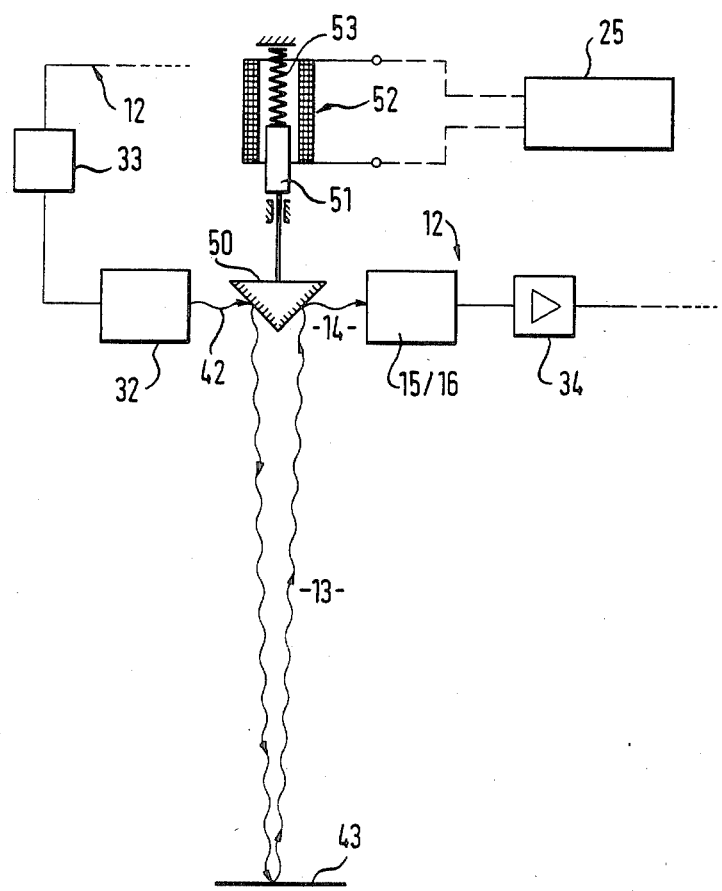

The invention will be described in the following by way of example only and with reference to the drawings which show:

FIG. 1 a block circuit diagram of an apparatus in accordance with the invention for measuring the transit time of electromagnetic waves, in particular of light, and FIG. 2 a modification of the input part of the apparatus shown in FIG. 1 with mechanical-optical changeover from the measurement beam path to the reference beam path.

As seen in FIG. 1 a central time control circuit 25 is connected via a first control line 41 to an OR gate 40, the output of which is connected to the trigger input 18 of a pulse generator 11 which consists of a pulse pause generator 30 and a pulse generator 31 connected thereto. A start signal in the form of a single pulse from the time control circuit 25 triggers a pause in the pulse pause generator 30 which defines a pause of for example 200 ns. The obliquely falling end flank of the pause defining pulse triggers a transmitted pulse in the pulse generator 31 with an obliquely rising leading flank and an obliquely falling end flank which has for example a length of 100 ns.

The output 17 of the pulse generator 11 is applied via a pulse shaper 33 to a light transmitter 32 which can for example be formed by a light transmitting diode. The pulse shaper 33 has an integrating character in order to form a pulse signal with a defined peak.

The light transmitted from the transmitter 32 is passed as a wave 42 to a measurement path 13 at the end of which there is for example a reflecting object 43. A beam divider 44 is located at the start of the measurement path 13 through which the transmitted light passes and from which the reflected light is deflected to a measurement receiver 15 in the form of a PIN diode.

A further part 45 of the transmitted light is directed via a reference path 14 which is made as short as possible to a reference receiver 16 in the form of a PIN diode.

If possible the distance between the transmitter 32 and the reference receiver 16 should be exactly as large as the distance between the transmitter 32 and the beam divider 44. To the extent that this is not possible, different basic distances can be taken into account later during the numerical evaluation.

First and second electronic switches 26 and 27 are connected to the measurement receiver 15 and to the reference receiver 16 respectively and are controlled via further control lines 46, 47 from the time control circuit 25.

The outputs of the switches 26, 27 are led to the input of an amplifier 34 which is followed by an amplitude regulator 35. A differentiation stage 36 is in turn connected to the amplitude regulator 35 and the output of the differentiation stage 36 is connected to a zero passage comparator 37. The zero passage comparator 37 leads via a gate 38 to the second input of the OR gate 40. The control input 48 of the gate 38 is energised by a gate control circuit 39 the set input S of which is connected with the output 17 of the pulse generator 11 and the reset input R of which is connected with the output of the gate 38.

The output 17 of the pulse generator 14 is also applied to two further electronic switches 28 and 29 which are controlled via control lines 46' and 47' in the same way as the electronic switches 26 and 27 respectively.

A measurement counter 20 and a reference counter 21 are connected to the outputs of the switches 28, 29 respectively. The added counts are applied to dividing stages 22, 23 which also receive further input signals in the form of respective input signals representative of the measurement time period T1 and of the reference time period T2. The outputs of the dividing stage 22, 23 are applied to a difference forming stage 24. A display device 49 is connected to the output of the difference forming stage 24 and indicates the transit time of the light pulses over the measurement path 13.

The switches 28, 29 and also the components which are connected thereto together form a computing-counting stage 19.

The manner of operation of the described apparatus is as follows:

On switching on the time control circuit 25 the first transmitted pulse is generated in the pulse generator 11 which passes via the output 17 and the pulse shaper 33 to the transmitter 32 and a corresponding light pulse is transmitted there which simultaneously passes along the measurement path 13 and the reference path 14.

It is assumed that the time control circuit 25 has first closed the switches 26 and 28 and keeps the other two switches 27, 29 open. The pulse signal received by the measurement received 15 now passes via the electronic switch 26, the amplifier 34, the amplitude regulator 35, the differentiation 36, the zero passage comparator 37, the gate 38 which has been opened by the gate control circuit 39, and the OR gate 40 to the trigger input 18 of the pulse generator 11 where a second pulse is now generated, corresponding to the time delay caused by the feedback loop 12 including the measurement path 13, and the second pulse takes the same path.

The switches 26, 28 are kept closed during a measurement time period T1 the length of which is a multiple of the pulse period. Thus, by way of example, 1000 or even $10^6$ pulses can pass round the feedback loop 12 provided in accordance with the invention during one measurement period T1 before the time control circuit 25 opens the switches 26, 28 and closes the switches 27, 29 in a kind of push pull relationship thereto.

Up till then the measurement counter 20 has added up all the pulses which have appeared during the time period T1. A corresponding time value signal T1 is divided in the dividing stage 22 by the pulse count signal which is applied thereto so that a signal representative of the total transit time of a pulse through the feedback loop 12 is applied to the input of the difference forming stage 24.

After closing of the switches 27 and 29 and the opening of the switches 26, 28, which occurs in push pull relationship, the light from the transmitter 32 passes via the reference path 14 to the reference receiver 16 and from there via the closed switch 27 finally again to the trigger input 18 of the pulse generator 11 where once again a further pulse is triggered, however after a somewhat shorter time because the path of the light over the reference path 14 is shorter.

During a reference time period T2, which is preferably the same as the measurement time period T1 the reference pulses now appearing in the reference counter 21 in the reference period T2 via the closed switch 29 are added up. At the end of the reference time period T2 the switches 27 and 29 open again and the time T2 is divided by the end count of the counter 21 in the dividing stage 23 so that a signal representative of the transit time of the pulses in the feedback loop 12 is formed at the output of the dividing stage 23. This time is shorter than the time measured during the cycle over the measurement path because the reference path 14 is shorter. The subtractor 24 then forms a signal at the display apparatus which shows the transit time of the light via the measurement path 13 because the base time for the passage of the pulses through the circuit itself and through the reference path 14 is subtracted from the circulation time of the pulses during one measurement cycle.

It is on the other hand possible to count the pulses occurring during a predetermined period, with this period amounting for example to one second (measurement or reference period).

It is however also possible to count a predetermined number of pulses and to measure the time required for them to run through the circuit. In both cases the pulse frequency is effectively measured over a longer period of time and the transit time deduced therefrom.

If $N_m$ is the number of the pulses counted during the measurement cycle, $N_r$ is the number of the pulses measured during the reference cycle $T_o$ is the respective measurement time then the transit time is calculated in accordance with the following formula:

$$t_L = T_o \cdot \left( \frac{1}{N_m} - \frac{1}{N_r} \right) \qquad (1)$$

The length s of the measurement path 13 is computed as follows:

$$s = 0{,}5 \cdot v \cdot T_o \cdot \frac{N_r - N_m}{N_m \cdot N_r} \qquad (2)$$

or $$s = 0{,}5 \cdot v \cdot T_o \cdot \left( \frac{1}{N_m} - \frac{1}{N_r} \right) \qquad (3)$$

the evaluation in accordance with the formulae 1 to 3 takes place for a constant measurement time $T_o \cdot v$ is the wave velocity along the measurement and reference path.

If the number N of the pulses appearing during the measurement and reference cycles is the same, and if the time duration $T_{om}$ and $T_{or}$ are measured during the measurement and reference cycles respectively, then the length s of the measurement path 13 is calculated as follows:

$$s = 0.5 \cdot v \cdot \frac{(T_{om} - T_{or})}{N} \quad (4)$$

The term can be simplified further because:

$$\frac{0.5 \cdot v}{N} = k \text{ (constant)} \quad (5)$$

which results in the relationship:

$$s = k \cdot (T_{om} - T_{or}) \quad (6)$$

The invention can also be used to determine the wave velocity along the measurement path 13 when the length s of the measurement path is known. The evaluation in an electronic processing circuit takes place in accordance with the first named method as follows:

$$v = 2 \cdot s \cdot \frac{N_m \cdot N_r}{(N_r - N_m) \cdot T_o} \quad (7)$$

In the second method the velocity v is determined in accordance with the following formula:

$$v = 2 \cdot s \cdot \frac{N}{T_{om} - T_{or}} \quad (8)$$

In each case the same media must be present along the measurement path 13 and the reference path 14.

The length of a partial path s' is a known medium with the wave velocity $v_{med}$ and known total path s, with the partial path s-s' being in air is computed in accordance with the first method as follows:

$$s' = 0.5 \cdot T_o \cdot \frac{\left[\left(\left(\frac{1}{N_m} - \frac{1}{N_r}\right) \cdot v_{air}\right) - s\right] \cdot v_{med}}{v_{air} - v_{med}} \quad (9)$$

and in accordance with the second method:

$$s' = 0.5 \frac{[((T_{om} - T_{or}) \cdot v_{air}) - s \cdot N] \cdot v_{med}}{N \cdot (v_{air} - v_{med})} \quad (10)$$

The functional block 19 in FIG. 1 thus only has symbolic character and can be realised in many other forms.

The alternating blending in and blending out of the measurement path 13 can be brought about by optical switching elements instead of by electronic switching elements. The advantage of an optical solution is the fact that parameter differences between two separate receiving elements as the measurement and reference receivers are omitted. Electronic switching elements have however the advantage that one does not then need an optical chopper.

In accordance with the invention a semiconductor luminescent diode is expediently used as the optical transmitter. The electronic switches arranged in the input should have a neutral behaviour so far as transit time is concerned. As it is not the switching time which is important here but instead the behaviour of the switches with regard to the transmission of signals, this requirement can easily be satisfied with semiconductor diode switches.

FIG. 2 shows how the change-over from a reference path 14 to a measurement path 13 can take place with optical means. In this case only a single common measurement/reference receiver 15, 16 is provided in the form of a PIN diode which is connected to the amplifier 34 of FIG. 1. The transmitter 32 in the form of a luminescent diode is located at a small distance in front of the receiver and is energised as in the embodiment of FIG. 1 from the pulse generator 11 via the pulse shaper 33. A ridge prism 50 with specularly reflecting surfaces is arranged between the light transmitter 32 and the measurement and reference receiver 15, 16. The ridge prism deflects the transmitted light beam 42 through approximately 90° to a reflecting object 43 from which the light is again reflected back to the ridge prism 50 which again reflects the received light through 90° to the measurement/reference receiver 15, 16.

The ridge prism 50 is connected with the armature 51 of an electromagnet 52 which is synchronously controlled with the switches 28, 29, which are present now as previously, by the time control circuit 25 so that on closing of the switch 28 and opening of the switch 29 the electromagnet 52 becomes currentless and its armature is pushed by a spring 53 into the outer position in which the ridge prism 50 which is connected to the armature 51 is located in accordance with FIG. 2 inside the reference beam path 14.

If the switch 28 is opened by the time control circuit and the reference switch 29 is closed then the electromagnet 52 is simultaneously energised and the armature 51 is drawn into the interior of the coil of the electromagnet 52 which leads to the ridge prism 50 being withdrawn from the reference beam path 14 and the pulse light beam 42 can now pass directly from the transmitter 32 to the measurement/reference receiver 15, 16.

The change-over of the feedback loop 12 from the reference path 14 to the measurement path 13 and vice versa thus takes place in the embodiment of FIG. 2 by optical-mechanical means. In the same way the change-over could also take place by a suitably designed chopper disk. In other respects the non-illustrated circuit parts of the embodiment of FIG. 2 are constructed and arranged in just the same way as is shown in FIG. 1.

The apparatus of the invention can also be used to measure paths along which electromagnetic waves move, thinking in particular of electromagnetic waves moving along very small paths (for example a resolution of 0.016 mm, i.e. a transit time of 0.055 ps). The invention is thus particularly suitable for the measurement of relatively short paths from a few millimeters to some tens of metres.

I claim:

1. Apparatus for measuring the transit time which electromagnetic waves need to pass from a transmitter to a measurement receiver, the apparatus comprising:
   a pulse triggered electrical pulse generator for transmitting an electromagnetic wave in the form of wave pulses along a measurement path;
   the transmitter being energized by the wave pulses;
   the measurement receiver being located at the end of the measurement path, receiving the wave pulses and converting them into electrical received pulses;

a feedback loop extending between an output of the pulse generator and a trigger input of the pulse generator and which is triggered by the pulses which have been generated by the pulse generator itself and have been fed back to the trigger input through said feedback loop;

the transmitter, the measurement path and the measurement receiver being inserted into the feedback loop between the output and the trigger input of the pulse generator during a first measurement time period (T1);

a reference receiver located at the end of a reference path, the transmitter transmitting the electromagnetic wave in the form of wave pulses also along the reference path;

the transmitter, the reference path and the reference receiver being inserted into the feedback loop between the output and the trigger input of the pulse generator during a second reference time period (T2);

the first and second time periods (T1, T2 respectively) being large relative to the duration of the pulses;

and means for feeding the pulses of the pulse generator to a computing/counting means which computes said transit time from the length of the measurement time period (T1) and the length of the reference time period (T2) and from the number of pulses transmitted during the respective time periods.

2. Apparatus in accordance with claim 1, wherein the computing/counting means comprises first and second counters which are connectable to the output of the pulse generator during the measurement period (T1) and the reference period (T2) respectively; the first and second counters being followed by dividing stages in which, at the end of the measurement period (T1) and of the reference period (T2), the respective quotient of the measurement period (T1) and the reference period (T2) and the number of pulses counted during these time periods are formed; the dividing stages being connected to a difference forming stage which delivers a signal representative of the transit time.

3. Apparatus in accordance with claim 1, wherein the measurement receiver and the reference receiver can be selectively and alternatively connected into the feedback loop via first and second switch means which can be closed by a time control circuit for the measurement period (T1) and the reference period (T2) respectively.

4. Apparatus in accordance with claim 2, wherein the first and second counters are selectively and alternatively connectable to the output of the pulse generator via switches which can be closed by the time control circuit for the measurement time period (T1) and the reference time period (T2) respectively.

5. Apparatus in accordance with claim 1, wherein the pulse generator comprises a pulse pause generator operatively connected to a pulse generator, the pulse pause generator being triggerable by an input pulse and the pulse generator being triggered at the end of the pulse pause generated by the pulse pause generator.

6. Apparatus in accordance with claim 1, including a pulse shaper which forming a pulse with a clear peak and inserted between the pulse generator and the transmitter.

7. Apparatus in accordance with claim 3, wherein the first and second switching means are connected to the measurement receiver and to the reference receiver and are jointly applied to an amplifier which leads to the pulse generator.

8. Apparatus in accordance with claim 7, including an amplitude regulator which follows the amplifer.

9. Apparatus in accordance with claim 3, including a differentiation stage inserted into the branch between the first and second switch means, which are respectively connected to the measurement receiver and to the reference receiver, and the trigger input of the pulse generator.

10. Apparatus in accordance with claim 9, including a zero passage comparator operatively disposed in the feedback loop after the differentiation stage (36).

11. Apparatus in accordance with claim 3, including a normally closed gate inserted into the branch between the first and second switch means, which are respectively connected to the measurement receiver and to the reference receiver, and the trigger input of the pulse generator the gate being opened by a gate control circuit on the appearance of a trailing flank of each transmitted pulse at ther output of the pulse generator and being closed again on the appearance of a received pulse at the output of the gate, a set input (S) of the gate control circuit being connected to the output of the pulse generator and a reset input (R) being connected to the output of the gate.

12. Apparatus in accordance with claim 1, including an OR gate inserted into the feedback loop directly in front of the pulse generator with the second input of the gate being connected to a time control circuit to receive a start-stop signal.

13. Apparatus in accordance with claim 3, wherein the first and second switch means comprise a common measurement-reference receiver arranged a short distance from the transmitter; and including an optical deflecting device adapted to be inserted in controlled manner into the reference path by the time control circuit for deflecting the electromagnetic wave via the measurement path to the measurement-reference receiver when it is brought into the reference path.

14. Apparatus in accordance with claim 1, wherein the measurement and reference time periods are constant and the pulses are counted.

15. Apparatus in accordance with claim 1, wherein the pulse counts are constant and the measurement and reference time periods are measured.

* * * * *